Figure 1:
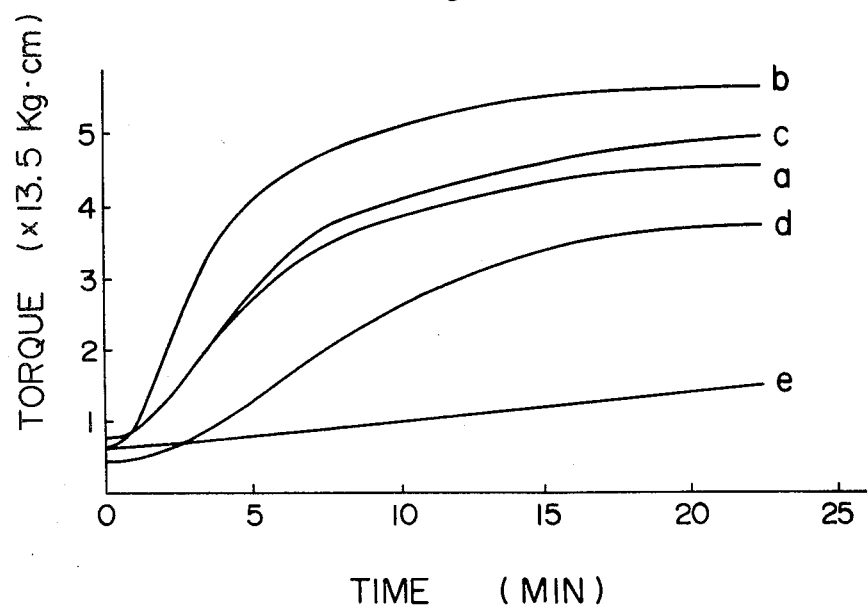

United States Patent [19]

Matoba

[11] 4,234,705

[45] Nov. 18, 1980

[54] CURABLE COMPOSITION OF HALOGEN-CONTAINING POLYMER AND CROSSLINKING AGENT THEREFOR

[75] Inventor: Yasuo Matoba, Toyonaka, Japan

[73] Assignee: Osaka Soda Co. Ltd., Osaka, Japan

[21] Appl. No.: 79,152

[22] Filed: Sep. 26, 1979

[30] Foreign Application Priority Data

Sep. 26, 1978 [JP] Japan ............................ 53-118892

[51] Int. Cl.$^3$ .................... C08J 3/24; C08C 19/32; C08F 8/30; C08G 65/32
[52] U.S. Cl. ........................... 525/329; 525/330; 525/331; 525/332; 525/333; 525/335; 525/348; 525/403; 528/373; 528/374
[58] Field of Search ............... 525/330, 331, 332, 329, 525/333, 335, 348, 356, 375, 403; 528/373, 374

[56] References Cited

U.S. PATENT DOCUMENTS

| | | | |
|---|---|---|---|
| 3,335,117 | 8/1967 | Berenbaum et al. | 260/85.5 |
| 3,448,063 | 6/1969 | Breslow | 260/2 |
| 3,700,650 | 10/1972 | Hani et al. | 260/79 |
| 3,708,461 | 1/1973 | Karastu et al. | 260/79 |

FOREIGN PATENT DOCUMENTS

49-96719 9/1974 Japan.

*Primary Examiner*—Earl A. Nielsen
*Attorney, Agent, or Firm*—Sherman & Shalloway

[57] ABSTRACT

A curable composition consisting essentially of
(1) 100 parts by weight of a halogen-containing polymer,
(2) 0.1 to 10 parts by weight of a 3,5-dimercapto-1,2,4-triazole compound defined in claim 1 as a crosslinking agent,
(b) 0.5 to 50 parts by weight of a compound of a metal of group II or IVa of the periodic table as an acid acceptor.

6 Claims, 1 Drawing Figure

CURABLE COMPOSITION OF HALOGEN-CONTAINING POLYMER AND CROSSLINKING AGENT THEREFOR

This invention relates to a curable composition of a halogen-containing polymer, and to a crosslinking agent therefor which can readily and effectively induce curing of the halogen-containing polymer.

More specifically, this invention pertains to a curable composition consisting essentially of (1) 100 parts of weight of a halogen-containing polymer, (2) 0.1 to 10 parts by weight of a 3,5-dimercapto-1,2,4-triazole compound as a crosslinking agent which is selected from compounds of the following formulae

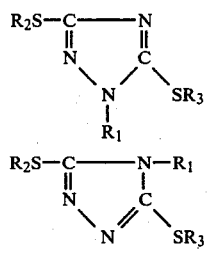

wherein $R_1$ represents a member selected from the class consisting of a hydrogen atom, alkyl groups containing 1 to 18 carbon atoms, cycloalkyl groups containing 5 to 18 carbon atoms, alkenyl groups containing 2 to 18 carbon atoms, aryl groups containing 6 to 18 carbon atoms and aralkyl groups containing 7 to 18 carbon atoms;

$R_2$ and $R_3$ are identical or different, and each represents a member selected from the class consisting of a hydrogen atom, a sodium atom, a potassium atom, groups of the formula

and groups of the formula

in which $R_4$ and $R_5$ are identical or different and each represents a member selected from the class consisting of a hydrogen atom, alkyl groups containing 1 to 12 carbon atoms, cycloalkyl groups containing 5 to 12 carbon atoms, aryl groups containing 6 to 12 carbon atoms and aralkyl groups containing 7 to 18 carbon atoms, or $R_4$ and $R_5$ may form a heterocyclic ring in combination with each other or through another heteroatom, and $R_6$ represents a member selected from the class consisting of alkyl groups containing 1 to 18 carbon atoms, cycloalkyl groups containing 5 to 18 carbon atoms, alkenyl groups containing 2 to 18 carbon atoms, aryl groups containing 6 to 18 carbon atoms, aralkyl groups containing 7 to 18 carbon atoms and groups of the formula

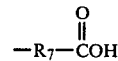

in which $R_7$ represents a member selected from the class consisting of alkylene groups containing 1 to 8 carbon atoms, alkenylene groups containing 1 to 8 carbon atoms, cycloalkylene groups containing 6 to 12 carbon atoms and arylene groups containing 6 to 12 carbon atoms;

and $SR_2$ and $SR_3$ may be bonded within the same molecular or among a plurality of molecules, forming a group of the formula

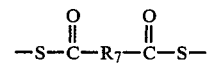

in which $R_7$ is as defined above, and (3) 0.5 to 50 parts by weight of a compound of a metal of group II or IVa of the periodic table as an acid acceptor. The invention also relates to the use of the aforesaid compounds of formula (I) and (I') as a crosslinking for halogen-containing polymers.

Halogen-containing polymers such as polychloroprene, polyepichlorohydrin, an epichlorohydrin/ethylene oxide copolymer, chlorine-containing acrylic rubber, chlorinated polyethylene, brominated butyl rubber, fluorine rubber and polyvinyl chloride in the cured state find extensive use as materials having superior thermal stability, oil resistance and chemical resistance. It has been difficult however to cure the halogen-containing polymers effectively because the carbon-halogen bond in these polymers is chemically stable.

Numerous curing agents for halogen-containing polymers have been suggested heretofore, but none have shown a satisfactory curing effect. 2-Mercaptoimidazoline, a typical curing agent now in commercial use, too, has the defect that it cannot cure polymers having relatively low reactivity, such as chlorinated polyethylene or polyvinyl chloride, at a feasible speed. In addition, it has been pointed out that 2-mercaptoimidazoline may be carcinogenic (P. R. Johnson, Rubber Journal, pages 37–44, April 1973).

In view of the state of the art, it has been desired to develop other curing agents of industrial value which can easily and effectively cure halogen-containing polymers relatively low reactivity.

We have worked extensively in order to develop such curing agents, and found that 3,5-dimercapto-1,2,4-triazoles of formula (I) or (I') given hereinabove are very useful as crosslinking agents which readily and effectively exert a curing action on a wide range of halogen-containing polymers including those of relatively low reactivity as exemplified hereinabove.

It is known that a certain compound which may be included within formula (I') representing the crosslinking agent of the present invention is an effective additive for a photographic silver halide emulsion prepared by forming silver halide in the presence of a bismuth ion (Japanese Laid-Open Patent Publication No. 96719/74).

It was reported that a compound corresponding to formula (I') in which $R_1$ is phenyl and $R_2$ and $R_3$ are hydrogens was investigated for utilization as a vulcanization accelerator in vulcanizing natural rubber using sulfur as a vulcanizer (Journal of the Society of Rubber Industry, Japan, Vol. 35, pages 166–170 (1962)). The report shows that in a Mooney scorch test at 250° F., the increase of Mooney value was less than 5 points with this particular compound within 120 minutes after the start of the test. This suggests the unacceptability of the compound as an accelerator for sulfur-vulcanization of natural rubber.

Unexpectedly, we have found that the 3,5-dimercapto-1,2,4-triazole compound selected from compounds of formulae (I) and (I'), optionally in combination with a vulcanization accelerator, exhibits superior performances as a crosslinking agent for a wide variety of halogen-containing polymers. It has also been found that cured products obtained by curing halogen-containing polymers together with a vulcanization accelerator have good properties, and the curing time changes little with changes in the amount of the crosslinking agent, thus ensuring a good reproducibility of quality.

It is an object of this invention therefore to provide an improved curable composition of a halogen-containing polymer.

Another object of this invention is to provide a crosslinking agent useful for such a curable composition.

The above and other objects and advantages of this invention will become more apparent from the following description.

The halogen-containing polymer in the curable composition of this invention includes a variety of polymers such as chlorinated polyethylene, a chlorinated ethylene-propylene copolymer, a chlorinated ethylene-/propylene/nonconjugated diene terpolymer, chlorosulfonated polyethylene, polyvinyl chloride, chlorine-containing acrylic rubber, chlorinated butyl rubber, brominated butyl rubber, fluorine rubber, polychloroprene, polyepichlorohydrin, an epichlorohydrin/allyl glycidyl ether copolymer, an epichlorohydrin/ethylene copolymer, and an epichlorohydrin/ethylene oxide/allyl glycidyl ether terpolymer.

The crosslinking agent used in this invention is 3,5-dimercapto-1,2,4-triazole or its derivatives of formulae (I) and (I'). In these formulae, $R_1$ is selected from the class consisting of alkyl groups containing 1 to 18 carbon atoms, preferably 1 to 7 carbon atoms, such as methyl, ethyl, isopropyl or heptyl; cycloalkyl groups containing 5 to 18 carbon atoms, preferably 6 to 14 carbon atoms, such as cyclohexyl, 4-ethylcyclohexyl or 4-(2-ethyl)hexyl-cyclohexyl; alkenyl groups containing 2 to 18 carbon atoms, preferably 3 to 18 carbon atoms, such as allyl or oleyl; aryl groups containing 6 to 18 carbon atoms, preferably 6 to 8 carbon atoms, such as phenyl, tolyl or p-ethylphenyl; and aralkyl groups containing 7 to 18 carbon atoms, preferably 7 to 10 carbon atoms, such as benzyl or phenethyl.

In the formulae (I) and (I'), $R_2$ and $R_3$ are identical or different, and each represents a member selected from the class consisting of a hydrogen atom, a sodium atom, a potassium atom, groups of the formula

and groups of the formula

$R_4$ and $R_5$ in the above definition are identical or different, and each represents a member selected from the class consisting of a hydrogen atom, alkyl groups containing 1 to 12 carbon atoms, preferably 1 to 8 carbon atoms, cycloalkyl groups containing 5 to 12 carbon atoms, preferably 6 to 8 carbon atoms, aryl groups containing 6 to 12 carbon atoms, preferably 6 or 7 carbon atoms and aralkyl groups containing 7 to 18 carbon atoms, preferably 7 or 8 carbon atoms. Or $R_4$ and $R_5$ may together form a heterocyclic ring preferably having 5 to 8 carbon atoms, or may form a heterocyclic ring through another heteroatom preferably oxygen or nitrogen.

Specific examples of the alkyl groups for $R_4$ and $R_5$ are methyl, ethyl, t-butyl and octyl; examples of cycloalkyl group are cyclohexyl and 4-ethyl-cyclohexyl; examples of the aryl group are phenyl and tolyl; and examples of the aralkyl group are benzyl and phenethyl. Examples of the heterocyclic ring formed by $R_4$ and $R_5$ are piperidino and pipecolino, and examples of the heterocyclic ring formed by these groups through another heteroatom are morpholino and piperazino.

In the group

$R_6$ is a member selected from the class consisting of alkyl groups containing 1 to 18 carbon atoms, preferably 1 to 17 carbon atoms, such as methyl, isopropyl, 2-ethyl-pentyl and heptadecyl; cycloalkyl groups containing 5 to 18 carbon atoms, preferably 6 to 8 carbon atoms, such as cyclohexyl and 4-ethyl-cyclohexyl; alkenyl groups containing 2 to 18 carbon atoms, preferably 6 to 17 carbon atoms, such as 2-hexenyl and heptadecenyl; aryl groups containing 6 to 18 carbon atoms, preferably 6 or 7 carbon atoms, such as phenyl and tolyl; and aralkyl groups containing 7 to 18 carbon atoms, preferably 7 or 8 carbon atoms, such as benzyl and phenethyl.

$R_6$ may also represent the group

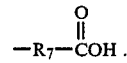

$R_7$ is a member selected from the class consisting of alkylene groups containing 1 to 8 carbon atoms, preferably 2 to 8 carbon atoms, such as ethylene, tetramethylene, hexamethylene and octamethylene; alkenylene groups containing 1 to 8 carbon atoms, preferably 4 to 8 carbon atoms, such as 2-butenylene, 3-hexenylene and 4-octenylene; cycloalkylene groups containing 6 to 12 carbon atoms, preferably 6 carbon atoms, such as 1,4-cyclohexylene; and arylene groups containing 6 to 12 carbon atoms, preferably 6 carbon atoms, such as o-phenylene, m-phenylene and p-phenylene.

$SR_2$ and $SR_3$ in each of formulae (I) and (I'), taken together, may form a group of the formula

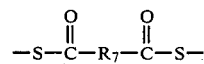

within the same molecule or among different molecules.

Typical examples of the crosslinking agent of formula (I) or (I') include
3,5-dimercapto-1,2,4-triazole,
1-methyl-3,5-dimercapto-1,2,4-triazole,
1-allyl-3,5-dimercapto-1,2,4-triazole,
3,5-dimercapto-1-phenyl-1,2,4-triazole,
3,5-dimercapto-1,2-triazole monosodium salt,
3,5-dimercapto-1-methyl-1,2,4-triazole disodium salt,
3,5-dimercapto-1-ethyl-1,2,4-triazole monopotassium salt, 1-allyl-3,5-dimercapto-1,2,4-triazole dipotassium salt,
N-methyl-3(5-mercapto-1-phenyl-1,2,4-triazolyl)sulfenamide,
N,N-dimethyl-3(5-mercapto-1-phenyl-1,2,4-triazolyl)-sulfenamide,
N,N-dicyclohexyl-3(1-allyl-5-mercapto-1,2,4-triazolyl)-sulfenamide,
1-methyl-3-mercapto-1,2,4-triazolyl-5-thiol acetate,
1-ethyl-3-mercapto-1,2,4-triazolyl-5-thiol stearate,
1-allyl-5-mercapto-1,2,4-triazolyl-3-thiol benzoate,
1-phenyl-1,2,4-triazolyl-3,5-dithiol-di-p-toluylate,
bis(3-mercapto-1-phenyl-1,2,4-triazolyl)-5-thiol sebacata,
4-methyl-3,5-dimercapto-1,2,4-triazole,
4-allyl-3,5-dimercapto-1,2,4-triazole,
4-phenyl-3,5-dimercapto-1,2,4-triazole,
4-methyl-3,5-dimercapto-1,2,4-triazole disodium salt,
4-ethyl-3,5-dimercapto-1,2,4-triazole monosodium salt,
N-methyl-3(4-ethyl-5-mercapto-1,2,4-triazolyl)sulfenamide,
N,N-diethyl-3(4-phenyl-5-mercapto-1,2,4-triazolyl)sulfenamide,
N,N-dicyclohexyl-5(4-allyl-3-mercapto-1,2,4-triazolyl)-sulfenamide,
N-tert.butyl-3(4-methyl-5-mercapto-1,2,4-triazolyl)sulfenamide,
4-methyl-3-mercapto-1,2,4-triazolyl-5-thiol acetate,
4-phenyl-5-mercapto-1,2,4-triazolyl-3-thiol benzoate,
4-ethyl-5-mercapto-1,2,4-triazolyl-5-thiol stearate,
4-allyl-5-mercapto-1,2,4-triazolyl-3-thiol benzoate,
4-phenyl-1,2,4-triazolyl-3,5-dithiol-di-p-toluylate, and
bis(4-phenyl-3-mercapto-1,2,4-triazolyl)-5-thiol sebacate.

The curable composition of this invention further contains a compound of a metal of Group II or IVa of the periodic table as an acid acceptor. The metal compounds as an acid acceptor include hydroxides, carbonates, carboxylates, silicates, borates, and phosphites of metals of Group II of the periodic table, preferably Mg, Ba, Ca and Zn; and oxides, basic carbonates, basic carboxylates, basic phosphites, basic sulfites, and tribasic sulfates of metals of Group IVa of the periodic table, preferably Sn and Pb. Specific examples are magnesia, magnesium hydroxide, barium hydroxide, magnesium carbonate, barium carbonate, quick lime, slaked lime, calcium carbonate, calcium silicate, calcium stearate, zinc stearate, calcium phthalate, magnesium phosphite, calcium phosphite, zinc oxide, tin oxide, litharge, red lead, white lead, dibasic lead phthalate, dibasic lead carbonate, tin stearate, basic lead phosphite, basic tin phosphite, basic lead sulfite, and tribasic lead sulfate.

The curable composition of this invention consists essentially of 100 parts by weight of the halogen-containing polymer (1), 0.1 to 10 parts by weight, preferably 0.3 to 6 parts by weight, of 3,5-dimercapto-1,2,4-triazole or its derivative (2) of formula (I) or (I') as a crosslinking agent, and 0.5 to 50 parts by weight, preferably 1 to 20 parts by weight, of the compound of a metal of Group II or IVa of the periodic table as an acid acceptor.

When the amount of the crosslinking agent (2) is below the specified limit, the crosslinking effect is insufficient, and when it exceeds the upper limit specified, the resulting cured product is comparatively brittle. When the amount of the acid acceptor is below the specified limit, the resulting cured product has poor resistance to heat deterioration, and when it exceeds the upper limit, the mechanical properties (such as tensile strength and elongation) of the resulting cured product are degraded.

In addition to the aforesaid three essential ingredients (1), (2) and (3), the curable composition of this invention may further include other additives conventionally used in the art.

Examples of such additives include organic or inorganic fillers such as calcium carbonate, clay, talc, diatomaceous earth, ferrite, mica powder, barium sulfate, graphite, glass fibers, cork powder and wood flour; reinforcing agents such as carbon black, silica, calcium silicate and basic magnesium carbonate; plasticizers such as dioctyl phthalate, diisodecyl adipate, chlorinated paraffin and process oils for rubbers; processing aids such as paraffin wax and stearic acid; antioxidants such as polymerized trimethyl dihydroquinoline, 2,6-di-tert-butyl-4-methyl-phenol and dilauryl thiodipropionate; coloring agents such as titanium oxide, red iron oxide and ultramarine; and fire retarding agents such as antimony trioxide, aluminum hydroxide, zinc borate, tris(chloroethyl)phosphate and tetrabromobisphenols.

The amounts of these additives per 100 parts by weight of the halogen-containing polymer are not more than about 1000 parts by weight for the fillers; not more than about 200 parts by weight for the reinforcing agent; not more than about 100 parts by weight for the plasticizers; not more than about 10 parts by weight for the processing aids; not more than about 5 parts by weight for the antioxidants; not more than about 50 parts by weight for the coloring agents; and not more than about 50 parts by weight for the fire retardants.

The composition of this invention may further include a vulcanization accelerator, the use of which is preferred for halogen-containing polymers having a relatively low reactivity such as chlorinated polyethylene, polyvinyl chloride, chlorinated butyl rubber and polyepichlorohydrin. Examples of the vulcanization accelerator are thiuram sulfides, dithiocarbamates, sulfenamides, aliphatic or aromatic amines, salts of weak acids such as 2-mercaptobenzothiazole, phthalic acid or benzoic acid with these amines, and addition products of these amines with alcohols or oximes, for examples adducts with cyclohexyl alcohol, or cyclohexanoneoxime.

Specific exmples of these vulcanization accelerators are dipentamethylenethiuram tetrasulfide, tetramethylthiuram disulfide, cadmium pentamethylenedithiocarbamate, tellurium dimethyldithiocarbamate, piperidine pentamethylenedithiocarbamate, cyclohexylamine, dibutylamine, di-ortho-tolyl guanidine, acetaldehyde aniline, N-cyclohexyl-2-benzothiazothiazyl sulfenamide, N,N'-dicyclohexyl-2-benzothiazyl sulfenamide, and a cyclohexylamine salt of 2-mercaptobenzothiazole.

The amount of the vulcanization accelerator is not particularly critical, but is preferably 0.2 to 6 parts by weight per 100 parts by weight of the halogen-containing polymer.

The curable composition of this invention can be prepared by uniformly blending 100 parts by weight of the halogen-containing polymer (1), 0.1 to 10 parts by weight of the 3,5-dimercapto-1,2,4-triazole compound (2) as a crosslinking agent, 0.5 to 50 parts by weight of the metal compound (3) as an acid acceptor, and optionally the other additives exemplified hereinabove. Blending can be effected by using known blending devices such as a mixing roll, a Banbury mixer, and various kneaders such as a pressure-type kneader. The blending temperature that can be employed is about 50° to about 100° C. for the curing agent and accelerator, and about 60° to about 200° C. for the other compounding agents.

The composition of this invention can be cured by heating it to a temperature of, say, about 100° to about 200° C. The heating time can be chosen properly, and may, for example, be about 0.5 to 120 minutes. Curing of the composition can be performed by any desired methods such as press-forming under heat in a mold, injection molding, and heat molding using a steam can, an air bath, an infrared ray, or microwaves.

The following examples illustrate the present invention more specifically.

EXAMPLES 1 TO 10 AND COMPARATIVE EXAMPLE 1

In each run, the ingredients shown in Tables and 1 and 2 were kneaded on an open roll at 60° to 70° C. The resulting sheet was placed in a mold, and molded under pressure at 155° C. and 80 kg/cm² for 30 minutes. The vulcanizate obtained was tested for the various properties shown in Tables 1 and 2. The results are shown in Table 3. In Comparative Example 1, 2-mercaptoimidazoline customarily used as a vulcanizer for chlorinated polyethylene was used.

The cure curves of the compounds obtained in Examples 4, 7 and 9 and Comparative Example 1 were determined by a JSR-type curelastometer at an angle of amplitude of 3° and a temperature of 155° C. The results are plotted in FIG. 1 in which curve a refers to Example 4; curve b, to Example 7; curve c, to Example 9; and curve e, to Comparative Example 1.

TABLE 1

| Example | 1 | 2 | 3 | 4 | Comparative Example 1 | 5 |
|---|---|---|---|---|---|---|
| Polychloroprene (*1) | 100 | | | | | |
| Epichlorohydrin/ethylene oxide copolymer (*2) | | 100 | | | | |
| Polyepichlorohydrin (*3) | | | 100 | | | |
| Chlorinated polyethylene (*4) | | | | 100 | 100 | |
| Brominated butyl rubber (*5) | | | | | | 100 |
| FEF carbon black (*6) | 40 | | | | | |
| MAF carbon black (*7) | | 40 | 40 | | | |
| SRF carbon black (*8) | | | | 50 | 50 | |
| HAF carbon black (*9) | | | | | | 50 |
| Stearic acid | | 1 | 1 | | | 1 |
| Dioctyl phthalate | | | | 30 | 30 | |
| Nickel dibutyldithiocarbamate | | 1 | 1 | | | |
| Magnesia | 5 | | | 10 | 10 | 5 |
| Magnesium hydroxide | | 5 | | | | |
| Barium carbonate | | | 5 | | | |
| Tellurium dimethyldithiocarbamate | | 2 | | | | |
| 2-Mercaptobenzothiazole salt of dicyclohexylamine | | | | 2 | | |
| 1-Methyl-3,5-dimercapto-1,2,4-triazole | 1 | | | | | |
| N,N-dicyclohexyl-3(5-mercapto-1-phenyl-1,2,4-triazolyl) sulfenamide | | 2 | | | | |
| 1-Phenyl-5-mercapto-1,2,4-triazolyl-3-thiol-p-toluylate | | | 3 | | | |
| 1-Phenyl-3,5-dimercapto-1,2,4-triazole monosodium salt | | | | 2 | | |
| N-cyclohexyl-3(5-mercapto-1-allyl-1,2,4-triazolyl)sulfenamide | | | | | | 2 |
| 2-Mercaptoimidazoline | | | | | 4 | |

TABLE 2

| Example | 6 | 7 | 8 | 9 | 10 |
|---|---|---|---|---|---|
| Polychloroprene (*1) | 100 | | | | |
| Epichlorohydrin/ethylene oxide copolymer (*2) | | 100 | | | |
| Polyepichlorohydrin (*3) | | | 100 | | |
| Chlorinated polyethylene (*4) | | | | 100 | |
| Brominated butyl rubber (*5) | | | | | 100 |
| FED carbon black (*6) | 40 | | | | |
| MAF carbon black (*7) | | 40 | 40 | | |
| SRF carbon black (*8) | | | | 50 | |
| HAF carbon black (*9) | | | | | 50 |
| Stearic acid | | 1 | 1 | | 1 |
| Dioctyl phthalate | | | | 30 | |
| Nickel dibutyldithiocarbamate | | 1 | 1 | | |
| Magnesia | 5 | | | 10 | 5 |
| Magnesium hydroxide | | 5 | | | |

TABLE 2-continued

| Example | 6 | 7 | 8 | 9 | 10 |
|---|---|---|---|---|---|
| Barium carbonate | | | 5 | | |
| Tetramethylthiuram disulfide | | | 2 | | |
| Piperidine pentamethylene-dithiocarbamate | | | | 3 | |
| N-cyclohexyl-3(4-phenyl-5-mercapto-1,2,4-triazolyl)sulfenamide | 1.5 | | | | |
| 4-Allyl-3,5-dimercapto-1,2,4-triazole | | 1.5 | | | |
| 4-Ethyl-3,5-dimercapto-1,2,4-triazole | | | 5 | | |
| 4-Phenyl-5-mercapto-1,2,4-triazolyl-3-thiol benzoate | | | | 2 | |
| N-tert.butyl-3(4-methyl-5-mercapto-1,2,4-triazolyl)sulfenamide | | | | | 1 |

(*1) to (*9) in TABLES 1 and 2 have the following meanings.
(*1): Neoprene W, a product of E. I. du Pont de Nemours & Co.
(*2): Herclor C-55, a product of Hercules, Inc.
(*3): Herclor H, a product of Hercules, Inc.
(*4): Daisolac MR-104, a product of Osaka Soda Co., Ltd.
(*5): Polysar Bromobutyl X-2, a product of Polyser, Ltd.
(*6): Seast SO, a product of Tokai Carbon Co., Ltd.
(*7): Seast 116, a product of Tokai Carbon Co., Ltd.
(*8): Seast S, a product of Tokai Carbon Co., Ltd.
(*9): Seast 3, a product of Tokai Carbon Co., Ltd.

The numerals in Tables 1 and 2 showing the amounts of the various ingredients are in parts by weight.

TABLE 3

| Example | 1 | 2 | 3 | 4 | Comparative Example 1 | 5 | 6 | 7 | 8 | 9 | 10 |
|---|---|---|---|---|---|---|---|---|---|---|---|
| 100% Modulus (kg/cm$^2$) | 52 | 37 | 34 | 33 | 17 | 33 | — | 44 | 29 | 37 | 24 |
| 300% Modulus (kg/cm$^2$) | 181 | 110 | 105 | 135 | 58 | 127 | — | 121 | 92 | 140 | 114 |
| Tensile strength (kg/cm$^2$) | 235 | 149 | 138 | 227 | 92 | 195 | 215 | 144 | 115 | 241 | 177 |
| Elongation at break (%) | 380 | 600 | 640 | 480 | 540 | 390 | 450 | 430 | 710 | 440 | 410 |
| Hardness (JIS-A) | 75 | 70 | 68 | 69 | 63 | 59 | 69 | 70 | 66 | 71 | 56 |
| Permanent compression set (%) | | | | | | | | | | | |
| 100° C. × 70 hrs., 25% compression | 18 | — | — | — | — | — | 23 | — | — | — | — |
| 120° C. × 70 hrs., 25% compression | — | 24 | 36 | 31 | 99 | — | — | 20 | — | 26 | — |

EXAMPLE 11

| | |
|---|---|
| Polyvinyl chloride (Zeon 103 EP, a product of Nippon Zeon Co., Ltd.) | 100 parts by weight |
| Precipitated calcium carbonate | 100 parts by weight |
| Dioctyl phthalate | 70 parts by weight |
| Magnesium hydroxide | 5 parts by weight |
| Dibutyl tin maleate | 1 parts by weight |

The above ingredients were kneaded on an open roll at 150° C. to form a compound. To 100 parts by weight of the resulting compound were added 2 parts by weight of 3,5-dimercapto-1-phenyl-1,2,4-triazole and 2 parts by weight of dicyclohexylamine (vulcanization accelerator), and the mixture was kneaded on an open roll at 100° C.

The cure curve of the compound was determined by a JSR-type curelastometer at an angle of amplitude of 3° and a temperature of 170° C. The results are shown by curve d in FIG. 1.

What we claim is:
1. A curable composition consisting essentially of
  (1) 100 parts by weight of a halogen-containing polymer,
  (2) 0.1 to 10 parts by weight of a 3,5-dimercapto-1,2,4-triazole compound as a crosslinking agent which is selected from compounds of the following formulae

$$R_2S-C \underset{N}{\overset{\parallel}{-}} \underset{\underset{R_1}{|}}{N} \overset{\parallel}{-} C \diagdown SR_3 \quad (I)$$

$$R_2S-C \underset{N}{\overset{\parallel}{-}} \underset{}{N} \overset{-R_1}{\underset{|}{-}} C \diagdown SR_3 \quad (I')$$

wherein
$R_1$ represents a member selected from the class consisting of a hydrogen atom, alkyl groups containing 1 to 18 carbon atoms, cycloalkyl groups containing 5 to 18 carbon atoms, alkenyl groups containing 2 to 18 carbon atoms, aryl groups containing 6 to 18 carbon atoms and aralkyl groups containing 7 to 18 carbon atoms;
$R_2$ and $R_3$ are identical or different, and each represents a member selected from the class consisting of a hydrogen atom, a sodium atom, a potassium atom, groups of the formula

and groups of the formula

in which

R$_4$ and R$_5$ are identical or different and each represents a member selected from the class consisting of a hydrogen atom, alkyl groups containing 1 to 12 carbon atoms, cycloalkyl groups containing 5 to 12 carbon atoms, aryl groups containing 6 to 12 carbon atoms and aralkyl groups containing 7 to 18 carbon atoms, or R$_4$ and R$_5$ may form a heterocyclic ring in combination with each other, or through another heteroatom, and R$_6$ represents a member selected from the class consisting of alkyl groups containing 1 to 18 carbon atoms, cycloalkyl groups containing 5 to 18 carbon atoms, alkenyl groups containing 2 to 18 carbon atoms, aryl groups containing 6 to b 18 carbon atoms, aralkyl groups containing 7 to 18 carbon atoms and groups of the formula

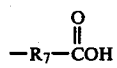

in which

R$_7$ represents a member selected from the class consisting of alkylene groups containing 1 to 8 carbon atoms, alkenylene groups containing 1 to 8 carbon atoms, cycloalkylene groups containing 6 to 12 carbon atoms and arylene groups containing 6 to 12 carbon atoms;

and SR$_2$ and SR$_3$ may be bonded within the same molecule or among a plurality of molecules, forming a group of the formula

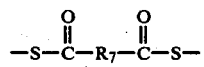

in which

R$_7$ is as defined above, and (3) 0.5 to 50 parts by weight of a compound of a metal of group II or IVa of the periodic table as an acid acceptor.

2. The composition of claim 1 wherein said halogen-containing polymer is a member selected from the group consisting of chlorinated polyethylene, a chlorinated ethylene-propylene copolymer, a chlorinated ethylene-propylene-nonconjugated diene terpolymer, chlorosulfonated polyethylene, polyvinyl chloride, chlorine-containing acrylic rubber, chlorinated butyl rubber, brominated butyl rubber, fluorine rubber, polychloroprene, polyepichlorohydrin, an epichlorohydrine-allyl glycidyl ether copolymer, an epichlorohydrin-ethylene oxide copolymer, and an epichlorohydrin-ethylene oxide-allyl glycidyl ether terpolymers.

3. The composition of claim 1 which further includes 0.2 to 6 parts by weight, per 100 parts by weight of the halogen-containing polymer, of a vulcanization accelerator.

4. The composition of claim 1 wherein said compound (3) is a compound of a metal selected from the group consisting of Mg, Ca, Ba, Zn, Sn and Pb.

5. The composition of claim 1 wherein in formulae (I) and (I'), R$_1$ represents a member selected from the class consisting of a hydrogen atom, alkyl groups containing 1 to 7 carbon atoms, cycloalkyl groups containing 6 to 14 carbon atoms, alkenyl groups containing 3 to 18 carbon atoms, aryl groups containing 6 to 8 carbon atoms and aralkyl groups containing 7 to 10 carbon atoms; and R$_2$ and R$_3$ are identical or different, and each represents a member selected from the group consisting of a hydrogen atom, a sodium atom, a potassium atom, groups of the formula

and groups of the formula

in which

R$_4$ and R$_5$ are identical or different, and each represents a member selected from the class consisting of a hydrogen atom, alkyl groups containing 1 to 8 carbon atoms, cycloalkyl groups containing 6 to 8 carbon atoms, aryl groups containing 6 or 7 carbon atoms and aralkyl groups containing 7 or 8 carbon atoms, or R$_4$ and R$_5$, taken together, may form a heterocyclic ring containing 5 or 6 carbon atoms, or form a heterocyclic ring selected from morpholino and piperadino through a heteroatom selected from oxygen and nitrogen, and R$_6$ represents a member selected from the group consisting of alkyl groups containing 1 to 17 carbon atoms, cycloalkyl groups containing 6 to 8 carbon atoms, alkenyl groups containing 6 to 17 carbon atoms, aryl groups containing 6 or 7 carbon atoms, aralkyl groups containing 7 or 8 carbon atoms and groups of the formula

in which

R$_7$ is a member selected from the class consisting of alkylene groups containing 2 to 8 carbon atoms, alkenylene groups containing 4 to 8 carbon atoms, a cycloalkylene group containing 6 carbon atoms, and an arylene group containing 6 carbon atoms; and SR$_2$ and SR$_3$ may be bonded within the same molecule or among a plurality of molecules, forming a group of the formula

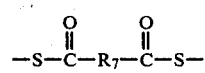

in which

R$_7$ is as defined above.

6. A method for curing halogen-containing polymers which comprises mixing the halogen-containing polymers with an effective amount of a crosslinking agent which is a 3,5-dimercapto-1,2,4-triazole compound selected from compounds of the following formula

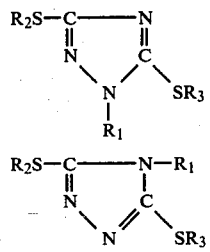

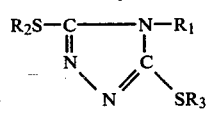

wherein $R_1$ represents a member selected from the class consisting of a hydrogen atom, alkyl groups containing 1 to 18 carbon atoms, cycloalkyl groups containing 5 to 18 carbon atoms, alkenyl groups containing 2 to 18 carbon atoms, aryl groups containing 6 to 18 carbon atoms and aralkyl groups containing 7 to 18 carbon atoms; $R_2$ and $R_3$ are identical or different, and each represents a member selected from the class consisting of a hydrogen atom, a sodium atom, a potassium atom, groups of the formula

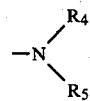

and groups of the formula

in which $R_4$ and $R_5$ are identical or different and each represents a member selected from the class consisting of a hydrogen atom, alkyl groups containing 1 to 12 carbon atoms, cycloalkyl groups containing 5 to 12 carbon atoms, aryl groups containing 6 to 12 carbon atoms and aralkyl groups containing 7 to is carbon atoms, or $R_4$ and $R_5$ may form a heterocyclic ring in combination with each other or through another heteroatom, and $R_6$ represents a member selected from the class consisting of alkyl groups containing 1 to 18 carbon atoms, cycloalkyl groups containing 5 to 18 carbon atoms, alkenyl groups containing 2 to 18 carbon atoms, aryl groups containing 6 to 18 carbon atoms, aralkyl groups containing 7 to 18 carbon atoms and groups of the formula —$R_7$—COH in which $R_7$ represents a member selected from the class consisting of alkylene groups containing 1 to 8 carbon atoms, alkenylene groups containing 1 to 8 carbon atoms, cycloalkylene groups containing 6 to 12 carbon atoms and arylene groups containing 6 to 12 carbon atoms;

and $SR_2$ and $SR_3$ may be bonded within the same molecule or among a plurality of molecules, forming a group of the formula

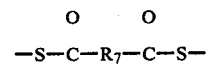

in which $R_7$ is defined above and heating the mixture.

* * * * *